(12) United States Patent  
Kitamura (10) Patent No.: US 7,410,278 B2
(45) Date of Patent: Aug. 12, 2008

(54) BICYCLE LIGHT ASSEMBLY WITH AUXILIARY OUTPUT CONNECTOR

(75) Inventor: Satoshi Kitamura, Sakai (JP)

(73) Assignee: Shimano Inc., Osaka (JP)

( * ) Notice: Subject to any disclaimer, the term of this patent is extended or adjusted under 35 U.S.C. 154(b) by 145 days.

(21) Appl. No.: 11/446,218

(22) Filed: Jun. 5, 2006

(65) Prior Publication Data
US 2007/0014120 A1    Jan. 18, 2007

(30) Foreign Application Priority Data
Jul. 12, 2005    (EP)    ................................. 05015070

(51) Int. Cl.
*B62J 3/00*    (2006.01)
(52) U.S. Cl. ........................ 362/473; 362/475; 340/432
(58) Field of Classification Search ......... 362/473–476, 362/192, 193, 194
See application file for complete search history.

(56) References Cited
U.S. PATENT DOCUMENTS
5,247,430 A * 9/1993 Schwaller ................... 362/473

7,119,668 B2 * 10/2006 Kitamura et al. ............ 340/432
2007/0014120 A1 * 1/2007 Kitamura ..................... 362/473

FOREIGN PATENT DOCUMENTS

| DE | 4137323 A1 | 5/1993 |
|---|---|---|
| DE | 20115825 U1 | 3/2002 |
| DE | 10147283 A1 | 4/2003 |
| DE | 202004009430 U1 | 11/2004 |
| EP | 1391974 A1 | 2/2004 |
| JP | 3094197 U | 6/2003 |

* cited by examiner

*Primary Examiner*—Anabel M Ton
(74) *Attorney, Agent, or Firm*—Global IP Counselors, LLP (57) ABSTRACT

A bicycle light assembly is electrically connected to a dynamo. The bicycle light assembly has a lamp housing mountable to a portion of the bicycle. An input portion is disposed on the lamp housing and electrically connected to the dynamo for inputting a dynamo output signal and for outputting an input signal. A regulator circuit is electrically connected to the input portion for regulating the input signal to a regulated signal. A light source is electrically connected to the regulator circuit for lighting the periphery and an output portion being disposed on the lamp housing and electrically connected to the regulator circuit for outputting the regulated signal. The output portion has at least one auxiliary electrical output connector for outputting the regulated signal to at least one auxiliary electrical device electrically connected to the at least one auxiliary electrical output connector.

17 Claims, 4 Drawing Sheets

BICYCLE LIGHT ASSEMBLY WITH AUXILIARY OUTPUT CONNECTOR

CROSS-REFERENCE TO RELATED APPLICATIONS

This application claims priority under 35 U.S.C. § 119 to European Patent Application No. 05 015 070.5. The entire disclosure of European Patent Application No. 05 015 070.5 is hereby incorporated herein by reference.

BACKGROUND OF THE INVENTION

1. Field of the Invention

The present invention generally relates to a bicycle light assembly. More specifically, the present invention relates to a bicycle head light assembly electrically connected to a dynamo for supplying the output of the dynamo to at least one electrical component coupled to the light assembly.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

In recent years, bicycles have been equipped with a number of electrical devices in order to meet various requirements by the users. Examples of electrical devices include lights, display devices, cell phone charger, electronic derailleurs and the like. In such a bicycle it is necessary to supply predetermined levels of power to each of the electrical devices. At the same time, it is necessary to deliver the predetermined power signal permanently to such components. While it is possible for each of the number of the above-mentioned electrical components to use batteries, the disadvantage of using batteries is to be seen in the inconvenience to replace them periodically. And even faster as the size and the need for electrical power of the electrical components increase.

Accordingly, there is a significant advantage in supplying each of the electrically components with its required power from a dynamo. However, since the requirement of power of the different electrical components will differ from component to component, a separate dynamo for each electrical component is provided on the bicycle. For example if a light and a cell phone charger are installed on a bicycle, a first dynamo is installed on the bicycle for the light and a second dynamo installed on the bicycle for the cell phone charger. In other words, in some conventional bicycles, a separate dynamo is provided for each of the electrical components as each of the electrical components requires a predetermined level of power. For example the Japanese Utility Model Patent Publication No. 3 094 197 U discloses an electric power supply and charging equipment for a bicycle wherein an electrical component, being one of a cellular phone, a pager, a radio, a personal digital assistant or a rechargeable battery, is directly coupled to a dynamo via a plug terminal and a rectifier transformer. The single dynamo delivers a power signal to the electrical component coupled thereto when it is switched on, which means that it is brought into contact with the wheel of the bicycle.

However, as the amount of the electrical components increases the amount of dynamos required has to be adapted to the plurality of electrical components. The mounting space which is required to mount the plurality of dynamos to the bicycle frame increases correlating with an increase of the weight of the bicycle at all. Actually the amount of electrical components that a rider may use on his bicycle is limited. Since a dynamo is designed to generate electricity through rotation of the bicycle wheel a greater amount of dynamos means a greater burden on the rider when the rider is turning the wheels to cause the dynamos generate power. The greater the burden is on he rider when turning the wheels the more likely it is that instability will result from insufficient power supply from dynamos to the electrical components.

In view of the above, it will be apparent to those skilled in the art from this disclosure that there exists a need for an improved bicycle light assembly. This invention addresses this need in the art as well as other needs, which will become apparent to those skilled in the art from this disclosure.

SUMMARY OF THE INVENTION

The present invention has been conceived to overcome these disadvantages in the prior art. Thus, one object of the present invention is to provide a bicycle light assembly that is configured to achieve the possibility of coupling a plurality of electrical components to a single dynamo and to deliver a stable and permanent output from the dynamo to the plurality of electrical components without installing multiple dynamos on the bicycle in a most efficient and space-saving way.

The foregoing object and other objects can basically be attained by providing a light assembly for a bicycle is electrically connected to a dynamo. The light assembly basically comprises a lamp housing, an input portion, a regulator circuit, a light source and an output portion. The lamp housing is configured to be mountable to a portion of the bicycle. The input portion is disposed on the lamp housing and configured to electrically receive a dynamo output signal and output an input signal. The regulator circuit is electrically connected to the input portion for regulating the input signal to a regulated signal. The light source is electrically connected to the regulator circuit regulator circuit for external lighting. The output portion is disposed on the lamp housing and electrically connected to the regulator circuit via a permanent connection for outputting the regulated signal. The output portion has at least one auxiliary electrical output connector permanently connected to output the regulated signal to at least one auxiliary electrical device electrically connected to the at least one auxiliary electrical output connector.

In a further aspect of the present invention, a charge storage element is disposed inside the lamp housing for storing the power delivered by the dynamo. The charge storage element is electrically connected to the input portion and to the regulator circuit outputting stored power to the regulator circuit when the dynamo is switched off to enable a permanent supply of a regulated signal to the at least one auxiliary electrical device that is electrically connected to the output portion of the light assembly. In this case, since a charge storage element accommodated within the lamp housing stores the dynamo output received from the input portion of the lamp housing, power from the dynamo can be supplied to the plurality of electrical components, even when the rider is not driving the bicycle.

With such a light assembly, an output signal from a dynamo is input into the regulator circuit in order to regulate the dynamo output signal and to deliver it to a plurality of electrical components coupled to the head light, wherein the plurality of electrical components includes of the electrical component and at least one auxiliary electrical component. Here, once the regulator circuit has regulated the dynamo output signal such that it can be used by each of the plurality of electrical components the dynamo signal having been regulated by the regulator circuit is output from the output portion to the plurality of electrical components, whereby the output signal of the dynamo may be delivered stable and permanent to the plurality of electrical components, without installing multiple dynamos on the bicycle. By such a permanent supply of the regulated dynamo output signal any kind of electrical component is mountable to the corresponding electrical output connector, in particular a cellular phone, a pager, a radio, a personal digital assistant or a rechargeable battery.

In another aspect of the present invention, the light assembly further comprises a wave shape circuit which is disposed inside the lamp housing. The wave shape circuit is electrically connected to the input portion to the input portion to generate a speed signal from the dynamo output signal received from the input portion.

In a further aspect of the present invention, a control unit is disposed inside the lamp housing of the light assembly. The control unit is electrically connected to the wave shape circuit and the regulator circuit. The control unit generates a composite signal from the regulated dynamo output signal and the speed signal received from the regulator circuit and the wave shape circuit. The control unit is also coupled to the output portion to permanently supply a composite signal to at least one of the electrical output connectors of the output portion. As an advantageous feature of the present invention also the composite signal consisting of the regulated dynamo output signal and the speed signal is permanently supplied to at least one of the electrical output connectors of the output portion by the control unit. By such a permanent supply of the composite signal any kind of electrical component is mountable to the corresponding electrical output connector, in particular a cycle computer displaying the speed of the bicycle.

In another aspect of the present invention, a rectifier circuit is disposed inside the lamp housing being electrically connected to the input portion and to the charge storage element. Further an auto-light circuit can be disposed inside the lamp housing having a sensor for automatically turning the lights on and off depending on the brightness.

Fortunately each electrical component of the plurality of electrical components, comprising the electrical component and the at least one auxiliary electrical component, is detachably coupled to the at least one electrical connector of the output portion of the light assembly. Following each electrical component may be coupled to and decoupled from the light assembly and each electrical component may be replaced by another. As already stated above the at least one electrical component connected to an electrical output connector outputting either a regulated dynamo signal or a composite signal can be one of a cycle computer and/or a radio, a cellular phone, a pager, a personal digital assistant (PDA), a rechargeable battery and/or a light. Of course it is obvious to a person skilled in the art that also other electrical components then the ones listed above can be coupled to the output portion of the light assembly.

In this regard it is either possible to directly connect the electrical components to the output portion by detachably attaching them into a corresponding mounting portion disposed on the lamp housing of the light assembly. Further, the at least one electrical component may also be detachably attached by a second connecting cord in order to mount the electrical component separately from the light assembly, e.g. to the frame or handle bar of the bicycle.

In another aspect of the invention, a hub dynamo particularly integrated in the hub of the front wheel is used to produce the power to be delivered to the light assembly in order to supply a permanent power signal. The hub dynamo is electrically connected to the input portion via a first connecting cord. Of course, any other dynamo falls under the disclosure of the present invention which is suitable to permanently supply electrical power to the light assembly.

According to the present invention, once a regulator circuit has regulated the output signal of a dynamo such that the output can be used by each of a plurality of electrical components, the output signal has been regulated by the regulator circuit is supplied to the plurality of electrical components by the output portion. Thereby, the plurality of electrical components coupled to the light assembly is supplied by a stable and permanent output of the dynamo, without installing multiple dynamos on the bicycle in a most efficient and space-saving way.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
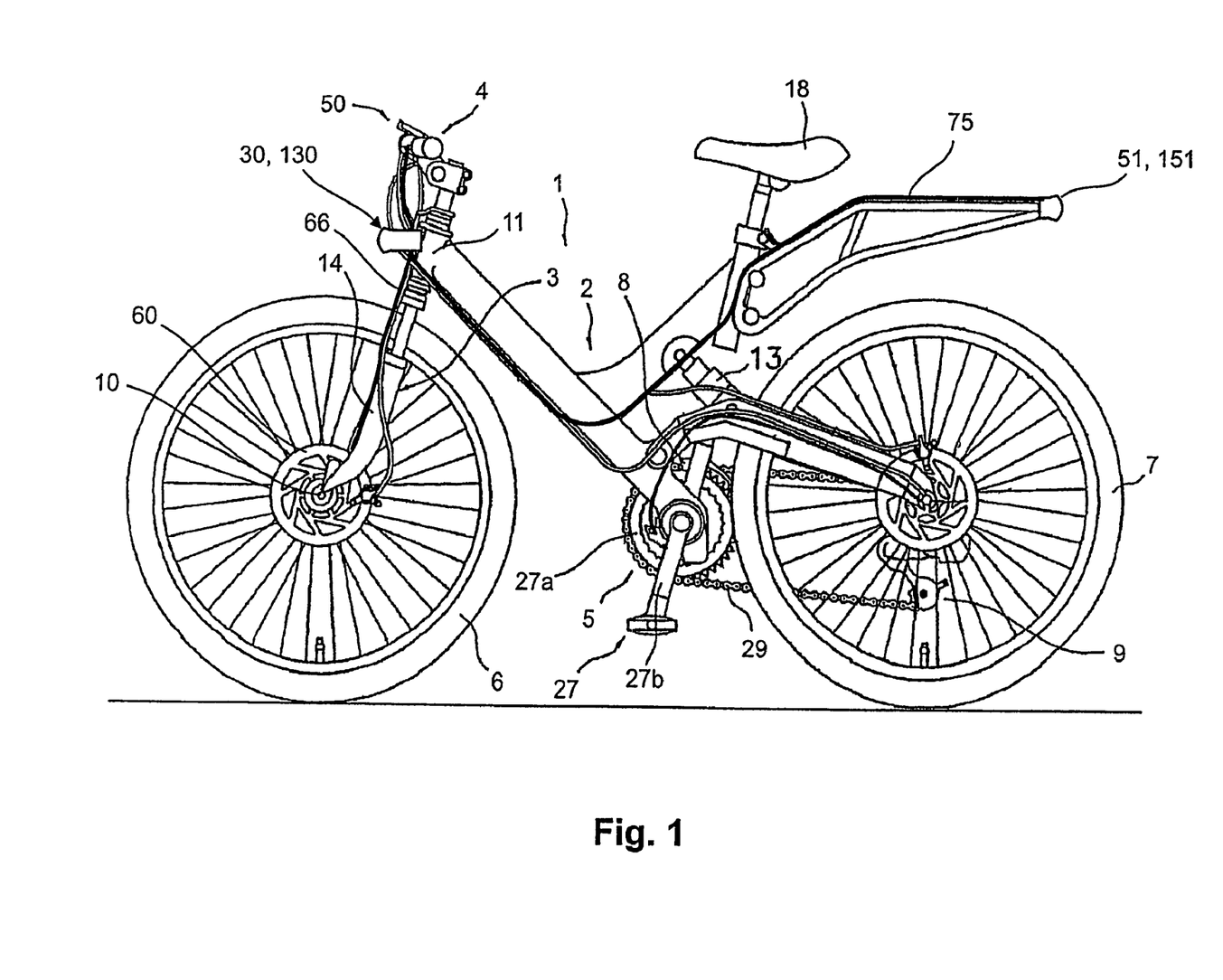
FIG. 1 is a side elevational view of a bicycle in accordance with one embodiment of the present invention.

Referring initially to FIG. 1, a bicycle is illustrated that is equipped with a first embodiment of the present invention. The bicycle pertaining to the invention is a mountain bike having front and rear suspensions. The bicycle includes, among other things, a frame 1 having a frame body 2 with a front fork 3, a handlebar portion 4, a drive portion 5, a front wheel 6 and a rear wheel 7. The frame body 2 of frame 1 is constructed of welded irregular-shaped pipe. The drive portion 5 includes front and rear derailleurs 8 and 9 and a controller (not shown) for controlling various components including the front and rear derailleurs 8 and 9. The front wheel 6 has a hub dynamo 10 installed thereon is mounted on the front fork 3 whereas the rear wheel 7 is installed to a rear portion of the bicycle frame 1. The frame body 2 has a head tube 11 with rear suspension 13 attached, while the front fork 3 has front suspension 14 attached.

Figure 2:
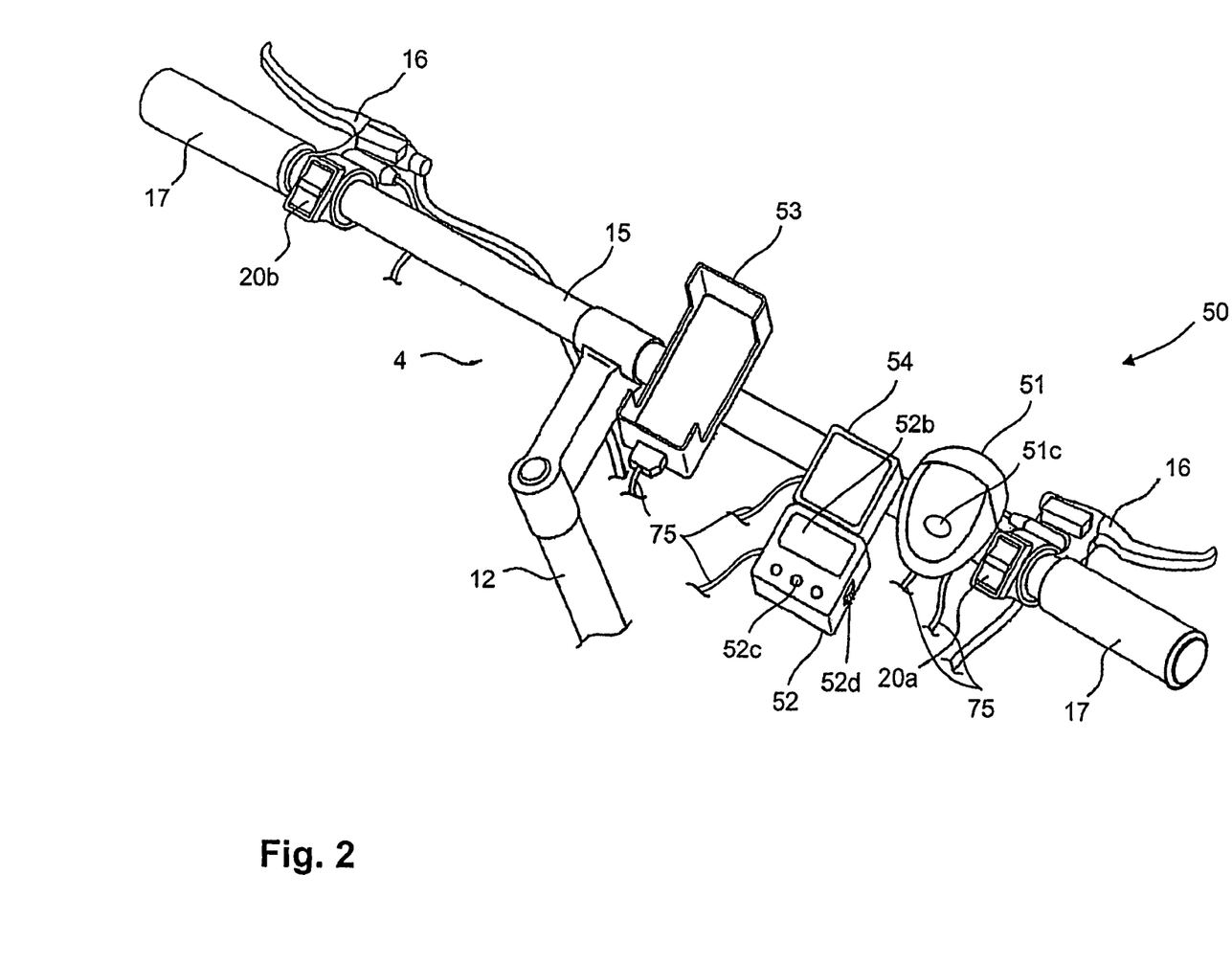
FIG. 2 is a perspective view of a handlebar portion of the bicycle illustrated in FIG. 1 in accordance with the present invention.

As shown in FIG. 2, the handlebar portion 4 has a handlebar stem 12 affixed to the upper end of front fork 3. A handlebar 15 is affixed to the handlebar stem 12. A brake lever 16 and a grip 17 are installed at each end of handlebar 15. Various components, including a saddle 18 and the drive portion 5, are mounted on the frame body 2. The front fork 3 is installed on the front of frame body 2 so as to swivel about a diagonally inclined axis. The handlebar 15 is provided with a pair of shift switches 20a and 20b. The shift switches 20a and 20b are mounted adjacent the brake levers 16. The shift switches 20a is used for manually shifting the rear derailleur 9, while the shift switches 20b is used for manually shifting the front derailleur 8.

The hub dynamo 10 of the front wheel 6 is a hub permitting installation of the brake disk 60 of a disk brake. Internally, the hub dynamo 10 houses an alternating current generator (not shown) that generates electricity by turning the front wheel 6. The alternating current generator is connected via a first connecting cord 66 to the head light assembly 30. At the rear wheel 7, a rear hub is equipped with a freewheel having a multiple-speed gear assembly. The drive portion 5 is disposed in the lower portion of frame body 2 (hanger portion), and basically includes the front derailleur 8 and the rear derailleur 9 in conjunction with the multiple-speed gear assembly having, for example, nine sprockets and a front crank assembly. The front crank assembly has a crank 27 with a right gear crank 27a with, for example, three sprockets and a left crank 27b. The drive portion 5 also has a chain 29 engageable on any of the sprockets of gear crank 27a and the multiple-speed gear assembly. The chain 29 engaged on sprockets of the right gear crank 27a and the multiple-speed gear assembly is then guided onto different sprockets on the gear crank 27a and the multiple-speed gear assembly by the derailleurs 8 and 9. In a drive portion of this kind, when shift switch 20a or 20b is operated, a control signal from shift switch 20a or 20b is processed by a controller (not shown). The controller (not shown) is also configured and arranged to control various electrical components including a light assembly 30 that is used for mounting a plurality of auxiliary electrical components or devices 50. The controller can be incorporated into a cycle computer or provided as a separate unit as needed and/or desired.

Figure 3:
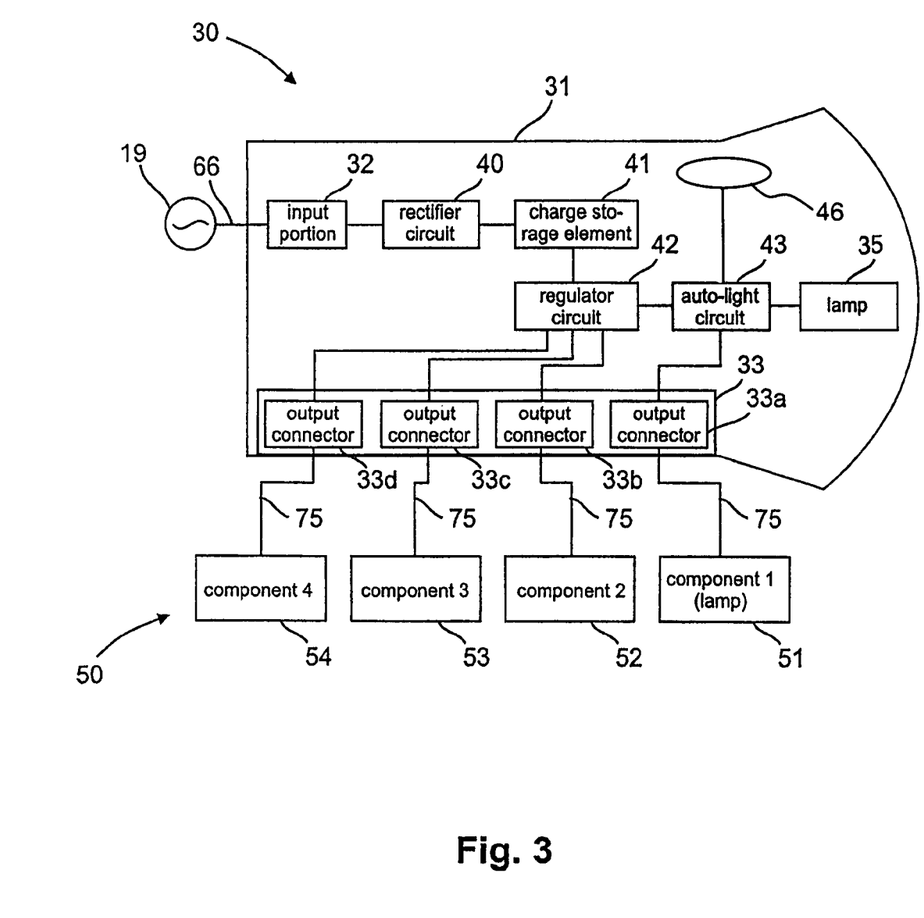
FIG. 3 is a block diagram showing an internal arrangement of the head light assembly in accordance with the present invention.

The light assembly 30 is a component for supplying outputs, such as power or electrical signals, from the alternating current generator of the hub dynamo 10 to the plurality of auxiliary electrical components 50. As shown in FIG. 2 or FIG. 3, the light assembly 30 has a lamp housing 31, an input portion 32, and an output portion 33. The light assembly 30 also has an internal light source 35 for providing external lighting from the lamp housing 31. A mounting member (not shown) is attachable to lamp housing 31. By this mounting member, the lamp housing 31 is detachably mounted on the head tube 11 (as shown) or on the handlebar 15 as needed and/or desired. The input portion 32 is disposed on the lamp housing 31, with the first connecting cord 66 connected to the input portion 33. The first connecting cord 66 connects the input portion 32 with the alternating current generator. The output portion 33 is disposed on the lamp housing 31, and comprises first to fourth electrical output connectors 33a, 33b, 33c and 33d.

As shown in FIG. 3, a rectifier circuit 40, a charge storage element 41, a regulator circuit 42 and an auto-light circuit 43 are all housed within the lamp housing 31 of the light assembly 30. The rectifier circuit 40 converts AC power from the alternating current generator 19 input to the input portion 33 into DC power. The rectified DC power from the rectifier circuit 40 is output by the rectifier circuit 40 to the charge storage element 41. The charge storage element 41 consists of a large capacity capacitor, for example, and stores the DC power that has been rectified by the rectifier circuit 40. The charge storage element 41 could include of a secondary cell, such as a nickel-cadmium cell, lithium ion cell, or nickel-hydrogen cell, rather than a capacitor. The DC power stored by the charge storage element 41 is supplied by the charge storage element 41 to the regulator circuit 42.

The regulator circuit 42 regulates power into predetermined power so that it can be used by each of the auxiliary electrical components 50 (e.g., a lamp 51, a radio 52, a cell phone charger 53 and a personal digital assistant 54) described later. The regulator circuit 42 comprises a voltage regulator circuit (not shown) that regulates DC voltage, supplied by the charge storage element 41, to predetermined voltage, and supplies this to the first electrical output connector 33a, the second electrical output connector 33b, the third electrical output connector 33c, the fourth electrical output connector 33d and to the auto-light circuit 43. In this voltage regulator circuit, DC voltage supplied by the charge storage element 41 is regulated, for example, to 1.2 V, 3.0 V, 3.5 V, and 3.7 V. 1.2 V DC power is output to the first electrical output connector 33a, 3.0 V DC power to the second and third electrical output connectors 33b and 33c, 3.7 V DC power to the fourth electrical output connector 33d and 3.5 V DC power to the auto-light circuit 43. The auto-light circuit 43 is provided for controlling power on the basis of a signal from a sensor 46 to automatically turn the light source 35 on and off. This auto-light circuit 43 also controls DC power from voltage regulator circuit 42 and outputs it to the first electrical output connector 33a and to the lamp 51 directly connected to the auto-light circuit 43. Power regulated in this manner in voltage regulator circuit and the auto-light circuit 43 is supplied by the first to fourth electrical output connectors 33a, 33b, 33c and 33d to the various electrical components 50.

As shown in FIG. 2, the auxiliary electrical components 50 include, for example, the lamp 51, the radio 52, the cell phone charger 53, and the personal digital assistant (PDA) 54. Each of the auxiliary electrical components 50 is detachably and reattachably mounted to the light assembly 30 via second connecting cords 75 that is detachably connecting each of the components 50 to its corresponding one of the electrical output connectors 33a to 33d.

The lamp 51, the cell phone charger 53 and the personal digital assistant (PDA) 54 are detachably mounted on handlebar 15. The radio 52 has a liquid crystal display portion 52b capable of displaying various bands (AM, FM etc.) and various frequencies. The radio is also provided with a control button 52c for selecting various bands and various frequencies, and a volume adjustment knob 52d. Alternatively, the radio or component 52 can be a pager having the liquid crystal display portion 52b, the control button 52c and the knob 52d.

One end of each of the second connecting cords 75 is connected to the lamp 51, the cell phone charger 53 and the personal digital assistant (PDA) 54, respectively. The other end of the second connecting cord 75 for the lamp 51 is detachably connected to the first electrical output connector 33a, the other end of the second connecting cord 75 for cell phone charger 53 is detachably connected to third electrical output connector 33c and the other end of the second connecting cord 75 for personal digital assistant (PDA) 54 is detachably connected to fourth electrical output connector 33d. By such an arrangement, the lamp 51, the cell phone charger 53 and the personal digital assistant (PDA) 54 are detachably connected to the output portion 33 of the light assembly 30 via each second connecting cord 75. The lamp 51 has an on/off switch 51c that can be used to turn the lamp 51 on and off. The cell phone charger 53 has a charging terminal (not shown) for charging a cell phone. The cell phone charger 53 is designed such that, when a cell phone is placed in cell phone charger 53, the charging terminal of the cell phone charger 53 comes into contact with a charging terminal (not shown) disposed on the cell phone to charge the cell phone. The personal digital assistant (PDA) 54 has also a charging terminal (not shown) for charging the personal digital assistant (PDA) 54. The personal digital assistant (PDA) charger is designed such that, when a personal digital assistant (PDA) 54 is placed in personal digital assistant (PDA) charger, the charging terminal of personal digital assistant (PDA) charger comes into contact with a charging terminal (not shown) disposed on the personal digital assistant (PDA), to charge the personal digital assistant (PDA).

As described hereinabove, the light assembly 30, by the rectifying circuit 40, rectifies AC power that is inputted by the input portion 32 from the alternating current generator 19 of hub dynamo 10 to give DC power. In the voltage regulator circuit of the regulator circuit 42, DC power supplied by charge storage element 41 is regulated to predetermined voltage, and output to first to fourth electrical output connectors 33a, 33b, 33c and 33d, respectively. Power signals regulated in regulator circuit 42 in this manner are output from first to fourth electrical output connectors 33a, 33b, 33c and 33d to the electrical components 50. When such the light assembly 30 is used, power signals from the hub dynamo 10 are regulated in the regulator circuit 42 into power signals able to be used by the individual electrical components 50. The power signals regulated by the regulator circuit 42 can then be supplied by the first to fourth electrical output connectors 33a, 33b, 33c and 33d to the electrical components 50. By this arrangement, power signals from the hub dynamo 10 can be supplied consistently to the electrical components 50.

Second Embodiment

Figure 4:
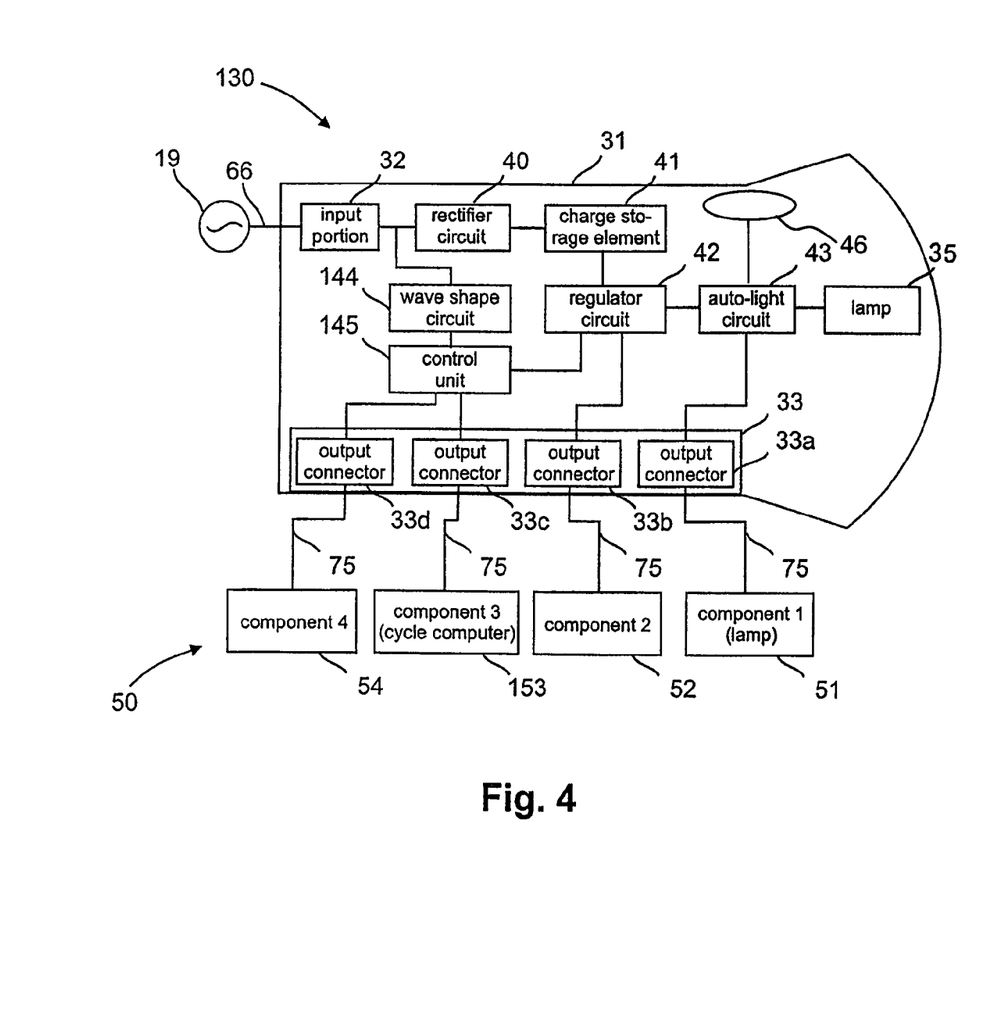
FIG. 4 is a block diagram showing an alternate embodiment of an internal arrangement of the head light assembly in accordance with the present invention.

Referring now to FIG. 4, an alternate light assembly 130 is illustrated in accordance with a second embodiment. In view of the similarity between the first and second embodiments, the descriptions of the parts of the second embodiment that are identical to the parts of the first embodiment may be omitted for the sake of brevity. Moreover, identical parts will be given the same reference number. Basically, the light assembly 130 is installed on the bicycle 1 in place of the light assembly 30. Thus, the light assembly 130 corresponds to the light assembly 30, as shown in FIG. 3, except that a wave shape circuit 144 and a control unit 145 have been added, which are disposed inside the lamp housing 31 and connected to the input portion 32. In particular, the control unit 145 is disposed in the lamp housing 31 and connected to the wave shape circuit 144 and the regulator circuit 42.

The light assembly 130 is a component for supplying outputs, such as power or electrical signals, from the alternating current generator of the hub dynamo 10 to the plurality of electrical components or devices 50. As shown in FIG. 4, similar to the first embodiment, this light assembly 130 has the housing 31, the input portion 32, and the output portion 33. The light assembly 130 also has the internal light source 35 for providing external lighting from the lamp housing 31, similar to the first embodiment. The mounting member (not shown) is attached to the lamp housing 31. By this mounting member, the housing 31 is detachably mounted on the head tube 11 (as shown in the first embodiment) or on the handlebar 15 as needed and/or desired. The input portion 32 is disposed on the housing 31, with the first connecting cord 66 connected to the input portion 32. The first connecting cord 66 connects the input portion 32 with the alternating current generator 19 of the hub dynamo 10. The output portion 33 is disposed on the housing 31, and includes the first to fourth electrical output connectors 33a, 33b, 33c and 33d, similar to the first embodiment.

As shown in FIG. 4, the rectifier circuit 40, the charge storage element 41, the regulator circuit 42, and the auto-light circuit 43 are all housed within the light assembly 130. The rectifier circuit 40 converts AC power from the alternating current generator 19 input to input portion 32 into DC power. The rectifier DC power from the rectifier circuit 40 is output by the rectifier circuit 40 to charge the storage element 41. The charge storage element 41 includes of a large capacity capacitor, for example, and stores the DC power that has been rectified by rectifier circuit 40. The charge storage element 41 could consist of a secondary cell, such as a nickel-cadmium cell, lithium ion cell, or nickel-hydrogen cell, rather than a capacitor. The DC power stored by charge storage element 41 is supplied by the charge storage element 41 to the voltage regulator circuit of the regulator circuit 42, described later.

The regulator circuit 42 regulates power, signals and the like into predetermined power, signals and the like so that these can be used by each of the electrical components 50 (e.g., the lamp 51, the radio 52, the cell phone charger 53 or the cycle computer 153, and the personal digital assistant 54). The regulator circuit 42 comprises a voltage regulator circuit. The wave shape circuit 144 is connected to the input portion 32. The voltage regulator circuit regulates DC voltage, supplied by the charge storage element 41, to predetermined voltage, and supplies this to the first electrical output connector 33a, the second electrical output connector 33b to the auto-light circuit 43, and to the control unit 145. In this voltage regulator circuit, DC voltage supplied by the charge storage element 41 is regulated, for example, to 1.2 V, 3.0 V, 3.5 V, and 3.7 V. 1.2 V DC power is output to the first electrical output connector 33a, 3.0 V DC power to the second electrical output connector 33b, 3.5 V DC power to the auto-light circuit 43 and 3.7 V DC power to the control unit 145. The wave shape circuit 144 converts the electrical signal (sine wave) from the alternating current generator 19 supplied to the input portion 32 into a pulsed signal (rectangular wave) or speed signal. This speed signal is output from wave shape circuit 144 to the control unit 145. The auto-light circuit 43 is provided for controlling power on the basis of a signal from a sensor 46 to automatically turn the light source 35 on and off. This auto-light circuit 43 controls DC power from voltage regulator circuit and outputs it to the first electrical output connector 33a and the lamp 51 directly connected to the auto-light circuit 43. The control unit 145 is supplied with the power signal from the regulator circuit 42 and with the speed signal from the wave shape circuit 144 converts power and electrical signal to a composite signal consisting of the power signal and the speed signal. The composite signal is supplied by the control unit to the third and fourth electrical output connectors 33c and 33d. Power and electrical signals regulated in this manner in the voltage regulator circuit and in the auto-light circuit 43 are supplied by the first to second electrical output connectors 33a and 33b to the various electrical components 50.

As shown in FIG. 4, each of the electrical components 50 includes, for example, the lamp 51, the radio 52, the cell phone charger 53 or the cycle computer 153 and the cell phone charger 54. Each of the electrical components 50 is detachably mounted to the light assembly 30 via the second connecting cords 75 detachably connecting each of the components 50 to its corresponding electrical output connector 33a to 33d.

The lamp 51, the radio 52, the cell phone charger 53 and the cell phone charger 54 correspond to the electrical components mentioned in accordance with the first embodiment of the invention. So these components will not be discussed again in every detail, except the cycle computer 153 as follows.

Figure 5:
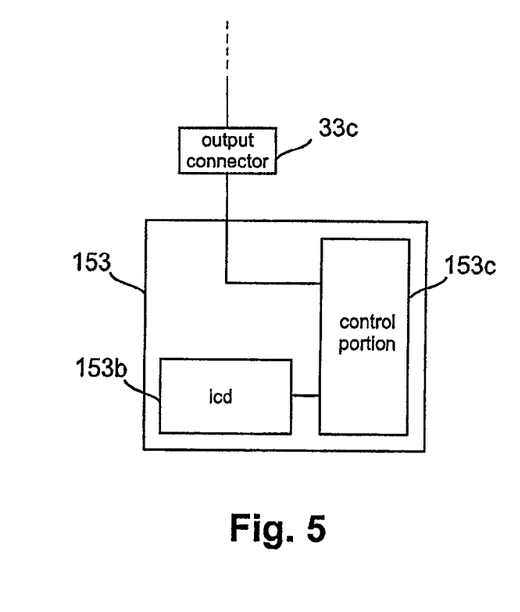
FIG. 5 is a block diagram showing an alternate embodiment of an internal arrangement of cycle computer in accordance with the present invention.

The cycle computer 153, as shown in FIG. 5, has a liquid crystal display portion 153b capable of displaying travel information of various kinds. A control portion 153c comprising a microcomputer is housed in the cycle computer 153. This control portion 153c derives travel information of various kinds (e.g. travel velocity or trip distance) on the basis of a pulsed signal from the third electrical output connector 33c, and displays travel information of various kinds on liquid crystal display portion 153b.

As described hereinabove, the light assembly 130, by the rectifying circuit 40, rectifies AC power that is inputted to the input portion 32 by the alternating current generator 19 of the hub dynamo 10 to give DC power. In the voltage regulator circuit of the regulator circuit 42, DC power supplied by the charge storage element 41 is regulated to predetermined voltage, and output to the first to second electrical output connectors 33a and 33b, to the auto-light circuit 43 and to the control unit 145, respectively. The light assembly 130, by the wave shape circuit 144, also converts the electrical signal (sine wave) supplied to the input portion 32 from the alternating current generator 19 of the hub dynamo 10 into a pulsed signal (rectangular wave) or speed signal. This speed signal is output from wave shape circuit 144 to the control unit 145. The control unit 145 is supplied with the power signal from the regulator circuit 42 and with the speed signal from the wave shape circuit 144 and converts power and electrical signal to a composite signal consisting of the power signal and the speed signal. The composite signal is supplied by the control unit 145 to the third and fourth electrical output connectors 33c and 33d. Power and electrical signals regulated in the light assembly 130 in this manner are output from the first to fourth electrical output connectors 33a, 33b, 33c and 33d to the plurality of electrical components 50. When the light assembly 130 is used, power and electrical signals from the hub dynamo 10 are regulated in the light assembly 130 into power signals and composite signals able to be used by individual electrical components 50. By this arrangement, power and electrical signals from the hub dynamo 10 can be supplied consistently to a plurality of electrical components 50.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle light assembly comprising:
a lamp housing configured to be mountable to a portion of the bicycle;
an input portion being disposed on the lamp housing and configured to electrically receive a dynamo output signal and output an input signal;
a regulator circuit electrically connected to the input portion for regulating the input signal to a plurality of regulated signals that supply regulated power;
a light source electrically connected to the regulator circuit for external lighting and configured to receive the regulated power; and
an output portion being disposed on the lamp housing and electrically connected to the regulator circuit via a permanent connection for outputting the regulated signal, the output portion having at least one auxiliary electrical output connector permanently connected to output the regulated signal to at least one auxiliary electrical device electrically connected to the at least one auxiliary electrical output connector.

2. The bicycle light assembly according to claim 1, wherein the lamp housing further includes a charge storage element disposed inside the lamp housing to store electrical power received by the input portion.

3. The bicycle light assembly according to claim 2, wherein the charge storage element is electrically connected to the input portion and to the regulator circuit to output stored power to the regulator circuit.

4. The bicycle light assembly according to claim 1, wherein the lamp housing further includes a wave shape circuit disposed inside the lamp housing, the wave shape circuit being electrically connected to the input portion to generate a speed signal from the dynamo output signal received from the input portion.

5. The bicycle light assembly according to claim 1, wherein the lamp housing further includes a control unit is disposed inside the lamp housing and electrically connected to the wave shape circuit and the regulator circuit to generate a composite signal from the regulated dynamo output signal and the speed signal.

6. The bicycle light assembly according to claim 5 wherein the regulator circuit is permanently connected to supply the dynamo output signal to the at least one auxiliary electrical output connector and to the control unit.

7. The bicycle light assembly according to claim 6 wherein the control unit is electrically connected to the output portion to supply a composite signal to the at least one auxiliary electrical output connector of the output portion.

8. The bicycle light assembly according to claim 7, wherein the control unit is permanently connected to supply the composite signal to at least one auxiliary electrical output connector of the output portion.

9. The bicycle light assembly according to claim 2, wherein the lamp housing further includes a rectifier circuit disposed inside the lamp housing with the rectifier circuit being electrically connected to the input portion and to the charge storage element.

10. The bicycle light assembly according to claim 1, wherein
the lamp housing further includes an auto-light circuit disposed inside the lamp housing with the auto-light circuit having a sensor for automatically turning the lamps on and off.

11. The bicycle light assembly according to claim 1, wherein
the at least one auxiliary electrical output connector is configured to be selectively detach and reattach the at least one auxiliary electrical device.

12. The bicycle light assembly according to claim 1, further comprising
a cycle computer coupled to the at least one electrical output connector.

13. The bicycle light assembly according to claim 1, further comprising
at least one of a radio, a cellular phone charger, a pager, a personal digital assistant, a rechargeable battery and a lamp coupled to the at least one electrical output connector.

14. The bicycle light assembly according to claim 1, further comprising
a hub dynamo electrically connected to the input portion with the hub dynamo supplying alternating current to the input portion.

15. The bicycle light assembly according to claim 1, further comprising
a dynamo coupled to the input portion via a connecting cord.

16. The bicycle light assembly according to claim 1, further comprising
at least one electrical component coupled to the at least one electrical output connector via a connecting cord.

17. The bicycle light assembly according to claim 1, wherein
the lamp housing further includes at least one mounting portion is formed on the lamp housing for reattachably connecting the at least one electrical device.

* * * * *